(12) United States Patent
Tsujimoto

(10) Patent No.: US 10,731,011 B2
(45) Date of Patent: Aug. 4, 2020

(54) ULTRA-HIGH MOLECULAR WEIGHT POLYETHYLENE POWDER AND ULTRA-HIGH MOLECULAR WEIGHT POLYETHYLENE FIBER

(71) Applicant: Asahi Kasei Kabushiki Kaisha, Tokyo (JP)

(72) Inventor: Koichi Tsujimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 56 days.

(21) Appl. No.: 16/211,567

(22) Filed: Dec. 6, 2018

(65) Prior Publication Data

US 2019/0177494 A1 Jun. 13, 2019

(30) Foreign Application Priority Data

Dec. 7, 2017 (JP) ................................. 2017-235199
Nov. 29, 2018 (JP) ................................. 2018-223735

(51) Int. Cl.
*C08F 10/02* (2006.01)
*C08J 3/12* (2006.01)
*C08J 3/00* (2006.01)
*D01F 6/04* (2006.01)
*C08F 110/02* (2006.01)
*C08F 210/16* (2006.01)

(52) U.S. Cl.
CPC ............... *C08J 3/122* (2013.01); *C08F 10/02* (2013.01); *C08J 3/005* (2013.01); *D01F 6/04* (2013.01); *C08F 110/02* (2013.01); *C08F 210/16* (2013.01); *C08J 2323/06* (2013.01); *C08J 2491/06* (2013.01); *D10B 2321/0211* (2013.01)

(58) Field of Classification Search
USPC ...................................................... 528/502 R
See application file for complete search history.

(56) References Cited

FOREIGN PATENT DOCUMENTS

JP 2010-235926 A 10/2010
JP 2014-118535 A 6/2014

*Primary Examiner* — Terressa Boykin
(74) *Attorney, Agent, or Firm* — Morgan, Lewis & Bockius LLP

(57) ABSTRACT

The present invention provides an ultra-high molecular weight polyethylene powder having a viscosity-average molecular weight of $10 \times 10^4$ or higher and $1000 \times 10^4$ or lower, wherein a difference between a temperature at which a torque value reaches 80% of the maximum torque value and a temperature at which the torque value reaches 20% of the maximum torque value is 0.1° C. or more and 50° C. or less in torque value measurement.

9 Claims, No Drawings

ULTRA-HIGH MOLECULAR WEIGHT POLYETHYLENE POWDER AND ULTRA-HIGH MOLECULAR WEIGHT POLYETHYLENE FIBER

TECHNICAL FIELD

The present invention relates to an ultra-high molecular weight polyethylene powder and an ultra-high molecular weight polyethylene fiber.

BACKGROUND ART

Ultra-high molecular weight polyethylene is excellent in impact resistance and abrasion resistance and is therefore used as an engineering plastic in various fields. Also, the ultra-high molecular weight polyethylene has a much higher molecular weight than that of general-purpose polyethylene and is therefore expected to produce a molded product having high strength and high elasticity if the ultra-high molecular weight polyethylene can be highly oriented. Thus, various studies have been made on higher orientation thereof.

Particularly, Patent Document 1 discloses a technique of a so-called "gel spinning method", which involves dissolving ultra-high molecular weight polyethylene in a solvent and drawing the obtained fiber in a gel form at a high ratio.

CITATION LIST

Patent Literature

Patent Literature 1: Japanese Unexamined Patent Application Publication No. 2010-235926

SUMMARY OF INVENTION

Technical Problem

The high-strength polyethylene fiber obtained by the "gel spinning method" is known to have very high strength and modulus of elasticity as an organic fiber and further have much better impact resistance, and its application is expanding in various uses. However, for the gel spinning method, it is very difficult to obtain a thread having a uniform thread diameter.

The present invention has been made in light of these problems, and an object of the present invention is to provide an ultra-high molecular weight polyethylene powder that can produce an ultra-high molecular weight polyethylene fiber having a uniform thread diameter and is highly drawable and continuously spinnable.

Solution to Problem

The present inventor has conducted diligent studies to attain the object and consequently completed the present invention by finding that a predetermined ultra-high molecular weight polyethylene powder can attain the object.

Specifically, the present invention is as follows:

[1] An ultra-high molecular weight polyethylene powder having a viscosity-average molecular weight of $10 \times 10^4$ or higher and $1000 \times 10^4$ or lower, wherein a difference between a temperature at which a torque value reaches 80% of the maximum torque value and a temperature at which the torque value reaches 20% of the maximum torque value is 0.1° C. or more and 50° C. or less in torque value measurement under the following <kneading condition>:

<kneading condition> raw material:
    a mixture containing 5 parts by mass of the ultra-high molecular weight polyethylene powder and 95 parts by mass of liquid paraffin based on 100 parts by mass in total of the ultra-high molecular weight polyethylene powder and the liquid paraffin, torque value measurement condition:
    the raw material is kneaded at 130° C. for 30 minutes and then further kneaded at 240° C. for 15 minutes;
    a heating rate from 130° C. to 240° C. is set to 22° C./min;
    a rotation number of a screw is set to 50 rpm; and
    the measurement is performed under a nitrogen atmosphere.

[2] The ultra-high molecular weight polyethylene powder according to [1], wherein the ultra-high molecular weight polyethylene powder has Mw/Mn of 6 or more and 14 or less.

[3] The ultra-high molecular weight polyethylene powder according to [1] or [2], wherein a content of an ultra-high molecular weight polyethylene powder particle of 53 μm or smaller is less than 10% by mass.

[4] The ultra-high molecular weight polyethylene powder according to any of [1] to [3], wherein a tap density of an on-powder in classification of the ultra-high molecular weight polyethylene powder through a screen mesh having an aperture size of 212 μm is 0.50 g/cm³ or larger and 0.60 g/cm³ or smaller.

[5] The ultra-high molecular weight polyethylene powder according to any of [1] to [4], wherein a ratio ($BD_{53}/BD_{300}$) of a bulk density ($BD_{53}$) of a pass-through powder in classification of the ultra-high molecular weight polyethylene powder through a screen mesh having an aperture size of 53 μm with respect to a bulk density ($BD_{300}$) of an on-powder in classification of the ultra-high molecular weight polyethylene powder through a screen mesh having an aperture size of 300 μm is 0.7 or more and 1.4 or less.

[6] The ultra-high molecular weight polyethylene powder according to any of [1] to [5], wherein the ultra-high molecular weight polyethylene powder has a melting point (Tm1) of 135° C. or higher and 145° C. or lower in DSC measurement.

[7] The ultra-high molecular weight polyethylene powder according to any of [1] to [6], wherein the ultra-high molecular weight polyethylene powder has a quantity of heat of melting (ΔH1) of 190 J/g or more and 230 J/g or less in DSC measurement.

[8] The ultra-high molecular weight polyethylene powder according to any of [1] to [7], wherein the amount of Si remaining in the ultra-high molecular weight polyethylene powder is less than 1 ppm.

[9] An ultra-high molecular weight polyethylene fiber prepared by spinning an ultra-high molecular weight polyethylene powder according to any of [1] to [8].

Advantageous Effects of Invention

The present invention provides an ultra-high molecular weight polyethylene powder that can produce an ultra-high molecular weight polyethylene fiber having a uniform thread diameter and is highly drawable and continuously spinnable.

BRIEF DESCRIPTION OF THE DRAWING

Hereinafter, a mode for carrying out the present invention (hereinafter, simply referred to as the "present embodiment") will be described in detail. However, the present invention is not intended to by limited thereby. Various changes or modifications can be made in the present invention without departing from the spirit thereof.

[Ultra-High Molecular Weight Polyethylene Powder]

The ultra-high molecular weight polyethylene powder of the present embodiment has a viscosity-average molecular weight of $10 \times 10^4$ or higher and $1000 \times 10^4$ or lower.

When the ultra-high molecular weight polyethylene powder is used as a raw material for an ultra-high molecular weight polyethylene fiber, the viscosity-average molecular weight is preferably in the range of $100 \times 10^4$ or higher and $950 \times 10^4$ or lower, more preferably in the range of $200 \times 10^4$ or higher and $900 \times 10^4$ or lower, from the viewpoint of moldability and final physical properties. In the present embodiment, the viscosity-average molecular weight refers to a value determined by determining an intrinsic viscosity from the specific viscosity of a polymer solution, and converting the intrinsic viscosity to a viscosity-average molecular weight.

The ultra-high molecular weight polyethylene powder of the present embodiment is preferably a powder consisting of an ethylene homopolymer and/or a copolymer of ethylene and an olefin (hereinafter, also referred to as a comonomer) copolymerizable therewith.

Specific examples of the olefin copolymerizable with ethylene include, but are not particularly limited to, at least one comonomer selected from the group consisting of α-olefins having 3 or more and 15 or less carbon atoms, cyclic olefins having 3 or more and 15 or less carbon atoms, compounds represented by the formula $CH_2=CHR^1$ (wherein $R^1$ is an aryl group having 6 to 12 carbon atoms), and linear, branched, or cyclic dienes having 3 or more and 15 or less carbon atoms. Among them, an α-olefin having 3 or more and 15 or less carbon atoms is preferred.

Examples of the α-olefin include, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

When the ethylene polymer of the present embodiment comprises a comonomer, the content of the comonomer unit in the ethylene polymer is preferably 0.01% by mol or more and 5% by mol or less, more preferably 0.01% by mol or more and 2% by mol or less, further preferably 0.01% by mol or more and 1% by mol or less.

[Viscosity-Average Molecular Weight]

The viscosity-average molecular weight (Mv) of the ultra-high molecular weight polyethylene powder of the present embodiment is $10 \times 10^4$ or higher and $1000 \times 10^4$ or lower, preferably $100 \times 10^4$ or higher and $950 \times 10^4$ or lower, more preferably $200 \times 10^4$ or higher and $900 \times 10^4$ or lower.

The viscosity-average molecular weight (Mv) of $10 \times 10^4$ or higher further improves strength. Also, the viscosity-average molecular weight (Mv) of $1000 \times 10^4$ or lower further improves moldability. Furthermore, the viscosity-average molecular weight (Mv) of $10 \times 10^4$ or higher and $1000 \times 10^4$ or lower offers better productivity and can suppress reduction in strength caused by molding The method for controlling the viscosity-average molecular weight (Mv) to the range mentioned above involves, for example, changing the polymerization temperature of a reactor where ethylene, or ethylene and an olefin copolymerizable therewith is (co)polymerized. The viscosity-average molecular weight (Mv) tends to be lower as the polymerization temperature is higher, and tends to be higher as the polymerization temperature is lower. Another method for controlling the viscosity-average molecular weight (Mv) to the range mentioned above involves appropriately changing the type of an organic metal compound for use as a promoter in the polymerization of ethylene, or ethylene and an olefin copolymerizable therewith. A further alternative method for controlling the viscosity-average molecular weight (Mv) to the range mentioned above involves adding a chain transfer agent in the polymerization of ethylene, or ethylene and an olefin copolymerizable therewith. The addition of the chain transfer agent tends to decrease the viscosity-average molecular weight of the ultra-high molecular weight polyethylene to be produced even at the same polymerization temperature.

[Difference Between Temperature at Which Torque Value Reaches 80% of Maximum Torque Value and Temperature at Which Torque Value Reaches 20% Of Maximum Torque Value]

Indexes under static conditions, such as density and melting point, are known as conventional physical property values known in the art attributed to the crystallinity of polyethylene powders. It is further known that molecular weight distribution, etc. also influences a crystal form in the course of drawing. However, it is very difficult to properly determine, by use of the indexes mentioned above, the molding processability of an ultra-high molecular weight polyethylene powder, which is much less likely to be softened as compared with general polyethylene powders.

Meanwhile, the addition of a plasticizer permits kneading itself of even an ultra-high molecular weight polyethylene powder, which is difficult to melt-knead alone due to its very high melt viscosity.

The present inventor has focused on the effect of a plasticizer from the viewpoint of a determination method, and determined the influence of crystallinity under dynamic conditions by using a kneading torque in the course of gel formation as an index in order to more conveniently and clearly determine physical properties preferred as a raw material for a drawn molded article.

As a result, the present inventor has found that an ultra-high molecular weight polyethylene powder is surprisingly preferred for obtaining a thread having a uniform thread diameter, wherein a difference between a temperature at which a torque value reaches 80% of the maximum torque value and a temperature at which the torque value reaches 20% of the maximum torque value is 0.1° C. or more and 50° C. or less in the kneading of a mixture containing 95 parts by mass of a plasticizer liquid paraffin and 5 parts by mass of the ultra-high molecular weight polyethylene powder using Labo Plastomill Mixer (unit model: 30C150, mixer model: R-60) manufactured by Toyo Seiki Seisaku-sho, Ltd. under the following <kneading condition>.

<Kneading Condition>

Raw Material:
   a mixture containing 5 parts by mass of the ultra-high molecular weight polyethylene powder and 95 parts by mass of liquid paraffin based on 100 parts by mass in total of the ultra-high molecular weight polyethylene powder and the liquid paraffin, Torque Value Measurement Condition:
   the raw material is kneaded at 130° C. for 30 minutes and then further kneaded at 240° C. for 15 minutes;
   a heating rate from 130° C. to 240° C. is set to 22° C./min;
   a rotation number of a screw is set to 50 rpm; and
   the measurement is performed under a nitrogen atmosphere.

In the present embodiment, the liquid paraffin can be liquid paraffin that plays a role as a plasticizer and is capable of forming a homogeneous solution at a temperature equal to or higher than the melting point of the ultra-high molecular weight polyethylene powder when kneaded with the ultra-high molecular weight polyethylene powder.

A nonvolatile solvent other than liquid paraffin may be used as a plasticizer for the purpose of determining the solubility and fusion properties of the ultra-high molecular weight polyethylene powder. Examples of the nonvolatile solvent other than liquid paraffin include: hydrocarbons such as paraffin wax; esters such as dioctyl phthalate and dibutyl phthalate; and higher alcohols such as oleyl alcohol and stearyl alcohol.

In the present embodiment, the maximum torque is the largest value of rotational load that occurs when a mixture containing the ultra-high molecular weight polyethylene powder and liquid paraffin is kneaded.

In the present embodiment, the mixture of the ultra-high molecular weight polyethylene powder and the liquid paraffin is preferably in a slurry state by premixing before the start of kneading.

A feature of the ultra-high molecular weight polyethylene powder of the present embodiment is that the torque elevates rapidly by kneading under the <kneading condition> mentioned above. The difference between a temperature at which a torque value reaches 80% of the maximum torque value and a temperature at which the torque value reaches 20% of the maximum torque value is 0.1° C. or more and 50° C. or less, preferably 1° C. or more and 40° C. or less, more preferably 2° C. or more and 30° C. or less, still more preferably 2° C. or more and 20° C. or less, further preferably 2° C. or more and 10° C. or less.

The powder having 0.1° C. or more difference between a temperature at which a torque value reaches 80% of the maximum torque value and a temperature at which the torque value reaches 20% of the maximum torque value in torque value measurement under the <kneading condition> can be completely dissolved and tends to resist end breakage during a gel spinning process. On the other hand, the powder having 50° C. or less difference therebetween tends to attain a small and stable melt tension and a uniform thread diameter and be able to extend a continuous spinnable time. Furthermore, the powder having 50° C. or less difference therebetween is drawable at a high ratio owing to the reduced entanglement of a molecular chain and is also capable of producing a high-strength thread.

In general, ultra-high molecular weight polyethylene can be stirred under heating with a solvent so that the molecular chain is disentangled to prepare a homogeneous gel. However, the further continuation of stirring tends to re-entangle the molecular chain by a Weissenberg effect to render the gel inhomogeneous. The torque elevates by disentangling the molecular chain through the dissolution of the powder in a solvent. For a powder for which the torque elevates gradually, it is difficult to prepare a homogeneous gel because the molecular chain disentangled at the initial stage of kneading is re-entangled. On the other hand, the ultra-high molecular weight polyethylene powder of the present embodiment can stop being stirred in the least entangled state of the molecular chain because the torque elevates immediately.

For exhibiting such a torque behavior, two points are necessary: an easily soluble component is present; and dissolution proceeds at once, beginning at the start of partial dissolution. For this purpose, the ultra-high molecular weight polyethylene powder is rich in an easily soluble low-molecular-weight component and has relatively low entanglement of the molecular chain, for example.

The ultra-high molecular weight polyethylene powder of the present embodiment can be obtained by, for example, a production method mentioned later. For the method for producing the ultra-high molecular weight polyethylene powder of the present embodiment, specifically, it is important to charge a catalyst and a solvent at the same time into a catalyst feed port and a hexane solvent feed port disposed at the bottom of a reactor, and to cool the solvent for use in a polymerization step to 5 to 10° C. before charging. Upon charging of a catalyst, reaction usually proceeds at once to generate heat (because a catalyst feed port and a solvent feed port differ in position and a cooled solvent is not used). In the case of the ultra-high molecular weight polyethylene powder according to the present embodiment, reaction proceeds mildly in a cooled system because a cooled solvent is charged into the system from near the catalyst feed port and the bottom of a reactor at the same time with the catalyst. The ultra-high molecular weight polyethylene powder thus obtained by polymerization is dried over 3 to 4 hours (long time) while nitrogen of 80° C. or lower is blown thereto.

As mentioned above, the ultra-high molecular weight polyethylene powder of the present embodiment can be obtained by suppressing rapid reaction and rapid polymerization and drying the resulting powder under mild conditions.

In the present embodiment, the torque value can be measured under the <kneading condition> mentioned above. Specifically, the measurement under the <kneading condition> is performed by the following method.

First, liquid paraffin and the ultra-high molecular weight polyethylene powder are kneaded at composition of 95 parts by mass and 5 parts by mass, respectively, based on 100 parts by mass in total of the ultra-high molecular weight polyethylene powder and the liquid paraffin. For preventing the oxidation of the ultra-high molecular weight polyethylene powder, it is preferred to add an antioxidant to the mixture of the ultra-high molecular weight polyethylene powder of the present embodiment and the liquid paraffin.

The amount of the antioxidant added is preferably 0.1 parts by mass or higher and 5.0 parts by mass or lower, more preferably 0.3 parts by mass or higher and 3.0 parts by mass or lower, further preferably 0.5 parts by mass or higher and 1.5 parts by mass or lower, based on 100 parts by mass in total of the ultra-high molecular weight polyethylene powder of the present embodiment and the liquid paraffin.

The atmosphere in the system can be set to the nitrogen atmosphere to thereby suppress the generation of oxygen radicals and the decomposition of the ultra-high molecular weight polyethylene powder ascribable to oxidative degradation.

The raw material for use in the torque value measurement is preferably a mixture consisting of 5 parts by mass of the ultra-high molecular weight polyethylene powder, 95 parts by mass of the liquid paraffin, and 0.1 parts by mass or more and 5.0 parts by mass or less of the antioxidant.

The ultra-high molecular weight polyethylene powder of the present embodiment, the liquid paraffin, and an additive are mixed by mixing these components in a poly-cup, then charging therewith Labo Plastomill Mixer (unit model: 30C150, mixer model: R-60) manufactured by Toyo Seiki Seisaku-sho, Ltd., kneading the mixture at 130° C. for 30 minutes, subsequently kneading the mixture under heating to 240° C. at a rate of 22° C./min, and further kneading the mixture at 240° C. for 15 minutes. The rotation number is 50 rpm for all the procedures. A maximum torque value and a resin temperature that exhibits the maximum torque value are read from change in average torque calculated using Labo Plastomill Mixer Test Program Ver. 4.52 (copyright (C), Toyo Seiki Seisaku-sho, Ltd.). The difference between a temperature at which a torque value reaches 80% of the maximum torque value and a temperature at which the torque value reaches 20% of the maximum torque value is calculated.

In the present embodiment, more specifically, the torque value and the resin temperature at which the torque value reaches a predetermined value of the maximum torque value can be measured by a method described in Examples.

[Powder Shape]

The shape of the ultra-high molecular weight polyethylene powder of the present embodiment is not particularly limited and may be a spherical shape or an amorphous shape. The ultra-high molecular weight polyethylene powder of the present embodiment may consist of primary particles, may be secondary particles composed of a plurality of primary particles aggregated and unified, or may a have a pulverized shape of secondary particles.

[Mw/Mn]

The molecular weight distribution (Mw/Mn) of the ultra-high molecular weight polyethylene powder of the present embodiment is preferably 6.0 or more and 14.0 or less, more preferably 6.5 or more and 13.0 or less, further preferably 7.0 or more and 12.0 or less.

When the ultra-high molecular weight polyethylene powder having a molecular weight distribution of 6.0 or more and 14.0 or less is kneaded with liquid paraffin, a low-molecular-weight component is swollen and melted faster than a high-molecular-weight component. Since the high-molecular-weight component is swollen and melted following the low-molecular-weight component, swelling and melting proceed at stages on a molecular weight basis so that a homogeneous kneaded product (kneaded gel) can be obtained. As a result, a fiber prepared therefrom not only tends to be able to produce a thread having a more uniform thread diameter and be able to further extend a continuous spinnable time but is also capable of producing a higher-strength thread.

Mw represents a weight-average molecular weight, and Mn represents a number-average molecular weight.

Mw/Mn can be controlled by using a catalyst mentioned later and/or adjusting polymerization conditions. Mw/Mn is closely related to the mechanism of polymerization reaction and varies from a relatively simple pattern having one peak to a pattern having a plurality of peaks. Also, the width of the molecular weight distribution can be adjusted by controlling a method for treating a catalyst carrier.

Mw/Mn can be measured by gel permeation chromatography (GPC) and, specifically, can be measured by a method described in Examples.

[Content of Ultra-High Molecular Weight Polyethylene Powder Particle Having Particle Size of 53 μm or Smaller]

In the ultra-high molecular weight polyethylene powder of the present embodiment, a content of an ultra-high molecular weight polyethylene powder particle having a particle size of 53 μm or smaller is preferably less than 10% by mass, more preferably less than 9% by mass, further preferably less than 8% by mass, based on 100% by mass in total of the ultra-high molecular weight polyethylene powder.

The lower limit of the content is not particularly limited and is usually 0% or more.

The ultra-high molecular weight polyethylene powder having the particle at content of less than 10% by mass, when kneaded with liquid paraffin, is melted prior to swelling of a fine powder having a particle size of 53 μm or smaller and can thus reduce the possibility of obtaining an inhomogeneous kneaded product (kneaded gel) ascribable to the fusion of powder particles. As a result, a fiber prepared therefrom not only tends to be able to produce a thread having a more uniform thread diameter and be able to further extend a continuous spinnable time but is also capable of producing a higher-strength thread.

The content of the ultra-high molecular weight polyethylene powder particle having a particle size of 53 μm or smaller can generally be controlled by adjusting the size and/or amount of a catalyst carrier for use in polymerization. The size of the catalyst carrier is adjusted to control the particle size of the produced ultra-high molecular weight polyethylene powder. Alternatively, the content on a particle size basis of the produced ultra-high molecular weight polyethylene powder can also be controlled by polymerization using a catalyst having a mixture of catalyst carriers having various sizes.

Specifically, the content of the ultra-high molecular weight polyethylene powder particle having a particle size of 53 μm or smaller can be measured by a method described in Examples.

[Tap Density of On-Powder in Classification Through Screen Mesh Having Aperture Size of 212 μM]

A tap density of an on-powder in classification of the ultra-high molecular weight polyethylene powder of the present embodiment through a screen mesh having an aperture size of 212 μm is preferably 0.50 g/cm$^3$ or larger and 0.60 g/cm$^3$ or smaller, more preferably 0.51 g/cm$^3$ or larger and 0.59 g/cm$^3$ or smaller, further preferably 0.52 g/cm$^3$ or larger and 0.58 g/cm$^3$ or smaller.

The ultra-high molecular weight polyethylene powder having a tap density of 0.50 g/cm$^3$ or larger and 0.60 g/cm$^3$ or smaller, when kneaded with liquid paraffin, tends to be able to produce a homogeneous kneaded product (kneaded gel) because the ultra-high molecular weight polyethylene powder is easily impregnated with the liquid paraffin. As a result, a fiber prepared therefrom not only tends to be able to produce a thread having a more uniform thread diameter and be able to further extend a continuous spinnable time but is also capable of producing a higher-strength thread.

The tap density can be controlled by, for example, a powder shape or a particle size distribution. The powder shape is attributed to a catalyst, and powders having various shapes from a nearly spherical shape to an uneven unique shape can be obtained. A powder having a shape closer to sphericity has a higher tap density. The particle size distribution can be controlled by adjusting the size and/or amount of a catalyst carrier for use in polymerization. The size of the catalyst carrier is adjusted to control the particle size of the produced ultra-high molecular weight polyethylene powder. Alternatively, the content on a particle size basis of the produced ultra-high molecular weight polyethylene powder can also be controlled by polymerization using a catalyst having a mixture of catalyst carriers having various sizes. A powder having a sharper particle size distribution has a more uniform particle size and has a higher tap density.

Specifically, the tap density can be measured by a method described in Examples.

[$BD_{53}/BD_{300}$ Ratio]

A ratio ($BD_{53}/BD_{300}$) of the ultra-high molecular weight polyethylene powder of the present embodiment is preferably 0.7 or more and 1.4 or less, more preferably 0.8 or more and 1.35 or less, further preferably 0.9 or more and 1.3 or less.

The ratio ($BD_{53}/BD_{300}$) is the ratio of a bulk density ($BD_{53}$) of a pass-through powder in classification of the ultra-high molecular weight polyethylene powder through a screen mesh having an aperture size of 53 μm with respect to a bulk density ($BD_{300}$) of an on-powder in classification of the ultra-high molecular weight polyethylene powder through a screen mesh having an aperture size of 300 μm.

The ultra-high molecular weight polyethylene powder having a ratio ($BD_{53}/BD_{300}$) of 0.7 or more can be prevented from having too high a bulk density of a powder having a large particle size. This can promote the permeation of a solvent into the powder having a large particle size and can reduce disadvantages ascribable to insoluble residues during drawing. Also, the ultra-high molecular weight polyethylene powder having a ratio ($BD_{53}/BD_{300}$) of 1.4 or less can be prevented from having too high a bulk density of a powder having a small particle size. This suppresses reduction in solubility in a solvent derived from the aggregation of particles of the powder having a small particle size and can reduce disadvantages ascribable to insoluble residues during drawing.

The bulk density generally differs depending on the catalyst used and can be controlled by the productivity of the ultra-high molecular weight polyethylene powder per unit catalyst. The bulk density of the ultra-high molecular weight polyethylene powder can be controlled by a polymerization temperature in polymerization for the ultra-high molecular weight polyethylene powder and can be decreased by elevating the polymerization temperature. Alternatively, the bulk density of the ultra-high molecular weight polyethylene powder may be controlled by a slurry concentration in a polymerization reactor and can be increased by elevating the slurry concentration.

Specifically, the ratio ($BD_{53}/BD_{300}$) can be measured by a method described in Examples.

[Melting Point (Tm1) and Quantity of Heat of Melting (ΔH1)]

A melting point (Tm1) of the ultra-high molecular weight polyethylene powder of the present embodiment is preferably 135° C. or higher and 145° C. or lower, more preferably 136° C. or higher and 144° C. or lower, further preferably 137° C. or higher and 143° C. or lower. The ultra-high molecular weight polyethylene powder having a melting point (Tm1) of 135° C. or higher and 145° C. or lower moderately ensures the amount of an easily soluble low-molecular-weight component and the entanglement of a molecular chain. Therefore, a fiber prepared therefrom not only tends to be able to produce a thread having a more uniform thread diameter and be able to further extend a continuous spinnable time but is also capable of producing a higher-strength thread. The melting point (Tm1) of the ultra-high molecular weight polyethylene powder of the present embodiment is measured using a differential scanning calorimeter (DSC) and is specifically a value measured using a differential scanning calorimeter Pyris 1 (trade name) manufactured by PerkinElmer, Inc.

Specifically, the melting point (Tm1) can be determined by keeping 8.4 mg of a sample at 50° C. for 1 minute, and then heating the sample to 180° C. at a rate of 10° C./min. In the present embodiment, the melting point is a temperature that exhibits the maximum peak in a melting curve on the basis of JIS K 7121.

The melting point (Tm1) can be adjusted by using a copolymer of ethylene and an additional comonomer as the ethylene polymer. Use of the copolymer of ethylene and an additional comonomer can lower the melting point as compared with an ethylene homopolymer. Alternatively, the melting point (Tm1) of an ethylene homopolymer can be adjusted by controlling the molecular weight of the ethylene polymer. The ethylene polymer having a molecular weight set to a high molecular weight can have a higher melting point than that of an ethylene polymer having a low molecular weight.

Specifically, the melting point (Tm1) can be measured by a method described in Examples.

The quantity of heat of melting (ΔH1) of the ultra-high molecular weight polyethylene powder of the present embodiment is preferably 190 J/g or more and 230 J/g or less, more preferably 194 J/g or more and 228 J/g or less, further preferably 198 J/g or more and 225 J/g or less. The ultra-high molecular weight polyethylene powder having a quantity of heat of melting (ΔH1) of 190 J/g or more and 230 J/g or less moderately ensures the amount of an easily soluble low-molecular-weight component and the entanglement of a molecular chain. Therefore, a fiber prepared therefrom not only tends to be able to produce a thread having a more uniform thread diameter and be able to further extend a continuous spinnable time but is also capable of producing a higher-strength thread. The quantity of heat of melting (ΔH1) is a value measured using a differential scanning calorimeter Pyris 1 (trade name) manufactured by PerkinElmer, Inc.

Specifically, the quantity of heat of melting (ΔH1) can be determined by keeping 8.4 mg of a sample at 50° C. for 1 minute, then heating the sample to 180° C. at a rate of 10° C./min, and dividing the total quantity of heat calculated from the whole crystal peak area in the melting curve thus obtained by the mass of the sample.

The ultra-high molecular weight polyethylene powder having a higher quantity of heat of melting (ΔH1) has a higher degree of crystallinity and is therefore more preferred for the physical properties of a drawn molded article. On the other hand, the ultra-high molecular weight polyethylene powder starts to dissolve from an amorphous moiety. Therefore, a powder having a higher degree of crystallinity is generally more difficult to mold. In the present embodiment, the degree of crystallinity means the percentage of the quantity of heat of melting (unit: J/g) of an ultra-high molecular weight polyethylene powder to the quantity of heat of melting (290.4 J/g) of a completely crystalline ultra-high molecular weight polyethylene powder.

The quantity of heat of melting (ΔH1) can be adjusted by using a copolymer of ethylene and an additional comonomer as the ethylene polymer. Use of the copolymer of ethylene and an additional comonomer can lower ΔH1 as compared with an ethylene homopolymer. Alternatively, the quantity of heat of melting (ΔH1) of an ethylene homopolymer can be adjusted by controlling the molecular weight of the ethylene polymer. The ethylene polymer having a molecular weight set to a high molecular weight can have higher ΔH1 than that of an ethylene polymer having a low molecular weight.

Specifically, the quantity of heat of melting (ΔH1) can be measured by a method described in Examples.

[Si Content in Ultra-High Molecular Weight Polyethylene Powder]

The silicon (Si) content of the ultra-high molecular weight polyethylene powder of the present embodiment is preferably less than 1 ppm.

The lower limit of the silicon (Si) content can be 0 ppm or more and may exceed 0.

The Si content can be controlled to the range mentioned above by, for example, a method using a Ziegler-Natta catalyst mentioned later in a polymerization step for the production of the ultra-high molecular weight polyethylene powder.

Specifically, the Si content can be measured by a method described in Examples.

[Method for Producing Ultra-High Molecular Weight Polyethylene Powder]

The ultra-high molecular weight polyethylene powder of the present embodiment can be produced, for example, by polymerizing ethylene alone, or ethylene and a comonomer in the presence of a catalytic component.

The catalytic component for use in the production of the ultra-high molecular weight polyethylene powder of the present embodiment is not particularly limited, and the ultra-high molecular weight polyethylene powder of the present embodiment can be produced using a general Ziegler-Natta catalyst.

<Ziegler-Natta Catalyst>

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the following formula 1 which is soluble in an inert hydrocarbon solvent with a titanium compound (A-2) represented by the following formula 2:

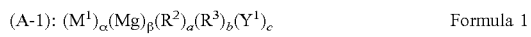

Formula 1 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0≤c, 0<a+b, 0≤c/(α+β)≤2, and nα+2β=a+b+c (wherein n represents the valence of $M^1$); and

Formula 2 wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, and encompasses all of dihydrocarbyl magnesium compounds and their complexes with other metal compounds. The relational expression nα+2β=a+b+c of the symbols α, β, a, b, and c represents the stoichiometry of metal atom valence and substituents.

In the formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When α>0, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. It is recommended that $R^2$ and $R^3$ satisfy any one of the following three conditions (1), (2), and (3) in the formula 1 wherein α=0.

Condition (1): at least one of $R^2$ and $R^3$ is a secondary or tertiary alkyl group having 4 or more and 6 or less carbon atoms, preferably both of $R^2$ and $R^3$ are alkyl groups having 4 or more and 6 or less carbon atoms and at least one of the groups is a secondary or tertiary alkyl group;

Condition (2): $R^2$ and $R^3$ are alkyl groups differing in the number of carbon atoms, preferably $R^2$ is an alkyl group having 2 or 3 carbon atoms and $R^3$ is an alkyl group having 4 or more carbon atoms; and Condition (3): at least one of $R^2$ and $R^3$ is a hydrocarbon group having 6 or more carbon atoms, preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 1, $Y^1$ is any of alkoxy, siloxy, allyloxy, amino, amide, —N=C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In the formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl and 2-ethylhexyl groups are particularly preferred.

In the formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting an organic magnesium compound selected from the group consisting of the formulas $R^2MgX^1$ and $R^2Mg$ (wherein $R^2$ is as defined above, and $X^1$ represents halogen) with an organic metal compound selected from the group consisting of the formulas $M^1R^3_n$ and $M^1R^3_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are added to the reaction system is not particularly limited. Any of the following methods can be used: the compound represented by the formula $Y^1$—H is added into the organic magnesium compound; the organic magnesium compound is added into the compound represented by the formula $Y^1$—H; and both of the compounds are added at the same time.

In the present embodiment, the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 2:

(A-2): $Ti(OR^7)_d X^1_{(4-d)}$ <span style="float:right">Formula 2</span> wherein d represents a real number of 0 or larger and 4 or smaller; $R^7$ represents a hydrocarbon group having 1 or more and 20 or less carbon atoms; and $X^1$ represents a halogen atom.

In the formula 2, d is preferably 0 or larger and 1 or smaller, further preferably 0. In the formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is most preferably titanium tetrachloride. In the present embodiment, two or more compounds selected from these compounds may be used as a mixture.

Next, the reaction between the compounds (A-1) and (A-2) will be described. The reaction is preferably carried out in an inert hydrocarbon solvent and further preferably carried out in an aliphatic hydrocarbon solvent such as hexane or heptane. In the reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably within the range of −80° C. or higher and 150° C. or lower, further preferably within the range of −40° C. or higher and 100° C. or lower. The order in which the compounds (A-1) and (A-2) are added to the reaction system is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by the formula 3 which is soluble in an inert hydrocarbon solvent with a chlorinating agent (C-2) represented by the formula 4, and allowing an organic magnesium compound (C-4) represented by the formula 5 which is soluble in an inert hydrocarbon solvent and a titanium compound (C-5) represented by the formula 6 to be supported by a carrier (C-3) thus prepared:

(C-1): $(M^2)_\gamma(Mg)_\delta(R^8)_e(R^9)_f(OR^{10})_g$ <span style="float:right">Formula 3</span> wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 \leq e+f$, $0 \leq g/(\gamma+\delta) \leq 2$, and $k\gamma + 2\delta = e+f+g$ (wherein k represents the valence of $M^2$);

(C-2): $H_h SiCl_i R^{11}_{(4-(h+i))}$ <span style="float:right">Formula 4</span> wherein $R^{11}$ represents a hydrocarbon group having 1 or more and 12 or less carbon atoms; and h and i each represent a real number that satisfies the following relationships: $0 < h$, $0 < i$, and $0 < h+i \leq 4$;

(C-4): $(M^1)_\alpha(Mg)_\beta(R^2)_a(R^3)_b Y^1_c$ <span style="float:right">Formula 5</span> wherein $M^1$ represents a metal atom selected from the group consisting of groups 12, 13, and 14 of the periodic system;

$R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0≤β, 0≤a, 0≤b, 0≤c, 0<a+b, 0≤c/(α+β)≤2, and nα+2β=a+b+c (wherein n represents the valence of $M^1$); and (C-5): $Ti(OR^7)_d X^1_{(4-d)}$   Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 3, the relational expression kγ+2δ=e+f+g of the symbols γ, δ, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When γ>0, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio δ/γ of magnesium to the metal atom $M^2$ is not particularly limited and is preferably 0.1 or more and 30 or less, further preferably 0.5 or more and 10 or less. In the case of using a predetermined organic magnesium compound wherein γ=0, for example, a compound wherein $R^8$ is 1-methylpropyl is soluble in an inert hydrocarbon solvent. Such a compound also brings about a preferred consequence to the present embodiment. It is recommended that $R^8$ and $R^9$ satisfy any one of the following three conditions (1), (2), and (3) in the formula 3 wherein γ=0.

Condition (1): at least one of $R^8$ and $R^9$ is a secondary or tertiary alkyl group having 4 or more and 6 or less carbon atoms, preferably, both of $R^8$ and $R^9$ are alkyl groups having 4 or more and 6 or less carbon atoms and at least one of the groups is a secondary or tertiary alkyl group;

Condition (2): $R^8$ and $R^9$ are alkyl groups differing in the number of carbon atoms, preferably, $R^8$ is an alkyl group having 2 or 3 carbon atoms and $R^9$ is an alkyl group having 4 or more carbon atoms; and Condition (3): at least one of $R^8$ and $R^9$ is a hydrocarbon group having 6 or more carbon atoms, preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group)($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of the formulas $R^8MgX^1$ and $R^8Mg$ (wherein $R^8$ is as defined above, and $X^1$ represents a halogen atom) with an organic metal compound selected from the group consisting of the formulas $M^2R^9_k$ and $M^2R^9_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio g/(γ+δ) of the alkoxy group to all metal atoms in the resulting alkoxy group-containing organic magnesium compound is 0≤g/(γ+δ)≤2, preferably 0≤g/(γ+δ)<1.

Next, the compound (C-2) will be described. The compound (C-2) is a silicon chloride compound having at least one Si—H bond, represented by the formula 4:

(C-2):$H_hSiCl_iR^{11}_{(4-(h+i))}$  Formula 4 wherein $R^{11}$ represents s hydrocarbon group having 1 or more and 12 or less carbon atoms; and h and i each represent a real number that satisfies the following relationships: 0<h, 0<i, and 0<h+i<4.

In the formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 or more and 3 or less carbon atoms, such as methyl, ethyl, propyl, and 1-methylethyl group are further preferred. Each of h and i is a number larger than 0 that satisfies the relationship h+i≤4. Preferably, i is 2 or larger and 3 or smaller.

Specific examples of such a compound include, but are not particularly limited to, $HSiCl_3$, $HSiCl_2CH_3$, $HSiCl_2C_2H_5$, $HSiCl_2$ $(C_3H_7)$ $HSiCl_2$ $(2-C_3H_7)$, $HSiCl_2$ $(C_4H_9)$, $HSiCl_2$ $(C_6H_5)$, $HSiCl_2$ $(4-Cl—C_6H_4)$, $HSiCl_2$ $(CH=CH_2)$ $HSiCl_2$ $(CH_2C_6H_5)$, $HSiCl_2$ $(1-C_{10}H_7)$, $HSiCl_2$ $(CH_2CH=CH_2)$, $H_2SiCl(CH_3)$, $H_2SiCl(C_2H_5)$, $HSiCl$ $(CH_3)_2$, $HSiCl(C_2H_5)_2$, $HSiCl(CH_3)$ $(2-C_3H_7)$, $HSiCl(CH_3)$ $(C_6H_5)$, and $HSiCl(C_6H_5)_2$. These silicon chloride compounds are used each alone or as a mixture of two or more types selected from these compounds. Among them, $HSiCl_3$, $HSiCl_2CH_3$, $HSiCl(CH_3)_2$, and $HSiCl_2$ $(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, further preferably 0.1 mol or higher and 10 mol or lower, of silicon atom contained in the compound (C-2) per 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the temperature in the reactor to a predetermined temperature while introducing the organic magnesium compound to the reactor. In the method of charging a reactor with the compound (C-1) in advance and then introducing the compound (C-2) to the reactor, the reaction temperature is preferably adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by the formula 5(C-4):

(C-4):$(M^1)_\alpha(Mg)_\beta(R^2)_a(R^3)_bY^1_c$  Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0<a+b, 0≤c/(α+β)≤2, and nα+2β=a+b+c (wherein n represents the valence of $M^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably within the range of −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by the formula 6:

(C-5):Ti(OR$^7$)$_d$X$^1_{(4-d)}$      Formula 6 wherein d represents a real number of 0 or larger and 4 or smaller; R$^7$ represents a hydrocarbon group having 1 or more and 20 or less carbon atoms; and X$^1$ represents a halogen atom.

In the formula 6, specific examples of the hydrocarbon group represented by R$^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by X$^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably –80° C. or higher and 150° C. or lower, further preferably within the range of –40° C. or higher and 100° C. or lower.

In the present embodiment, the method for allowing the compound (C-5) to be supported by the carrier (C-3) is not particularly limited and may involve reacting an excess of the compound (C-5) with the carrier (C-3) and/or using a third component to efficiently support the compound (C-5). A method of achieving this supporting through the reaction between the compound (C-5) and the organic magnesium compound (C-4) is preferred.

Next, the organic metal compound component [B] in the present embodiment will be described. The solid catalytic component in the present embodiment can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by the formula 7 are preferably used each alone or as a mixture as the organic aluminum compound:

AlR$^{12}_j$Z$^1_{(3-j)}$      Formula 7 wherein R$^{12}$ represents a hydrocarbon group having 1 or more and 20 or less carbon atoms; Z$^1$ represents a group selected from the group consisting of hydrogen, halogen, alkoxy, allyloxy, and siloxy groups; and j represents any number of 2 or larger and 3 or smaller.

In the formula 7, specific examples of the hydrocarbon group having 1 or more and 20 or less carbon atoms, represented by R$^{12}$ include, but are not particularly limited to, aliphatic hydrocarbons, aromatic hydrocarbons, and alicyclic hydrocarbons, for example, trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis(2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by the formula 3 which is soluble in an inert hydrocarbon solvent:

(M$^2$)$_γ$(Mg)$_δ$(R$^8$)$_e$(R$^9$)$_f$(OR$^{10}$)$_g$      Formula 3 wherein M$^2$ represents a metal atom selected from the group consisting of groups 12, 13, and 14 of the periodic system; R$^8$, R$^9$, and R$^{10}$ each represent a hydrocarbon group having 2 or more and 20 or less carbon atoms; and γ, δ, e, f, and g each represent a real number that satisfies the following relationships: 0≤γ, 0<δ, 0≤e, 0≤f, 0≤g, 0<e+f, 0≤g/(γ+δ)≤2, and kγ+2δ=e+f+g (wherein k represents the valence of M$^2$).

This organic magnesium compound is represented in the form of an organic magnesium complex compound soluble in an inert hydrocarbon solvent, but encompasses all of dialkyl magnesium compounds and their complexes with other metal compounds. Although γ, δ, e, f, g, M$^2$, R$^8$, R$^9$, and OR$^{10}$ are as already defined, this organic magnesium compound is preferably a compound wherein the ratio δ/γ is in the range of 0.5 or more and 10 or less, more preferably a compound wherein M$^2$ is aluminum, because a compound having higher solubility in an inert hydrocarbon solvent is more preferred.

The ratio between the solid catalytic component and the organic metal compound component [B] to be combined is not particularly limited and is preferably 1 mmol or higher and 3,000 mmol or lower of the organic metal compound component [B] per g of the solid catalytic component.

The ultra-high molecular weight polyethylene powder of the present embodiment exhibits, as mentioned above, a specific torque behavior under the <kneading condition>. For obtaining the ultra-high molecular weight polyethylene powder of the present embodiment, it is preferred that polymerization reaction should proceed under mild conditions. Examples of the method for rendering the polymerization conditions mild include methods as described below.

As for the method for adding the solid catalytic component and the organic metal compound component [B] into a polymerization system placed under polymerization conditions, these components may be separately added into the polymerization system, or the components may be reacted in advance and then added into the polymerization system. For the addition, it is preferred to add the components from the inside bottom of the polymerization system.

It is preferred to use hexane cooled to 5° C. or higher and 10° C. or lower as the solvent, and it is also preferred to add the solvent from the inside bottom of the polymerization system at the same time with the addition of the catalyst. Upon charging of a catalyst, reaction usually proceeds rapidly to generate heat (because a catalyst feed port and a hexane solvent feed port differ in position and cooled hexane is not used). However, in the present embodiment, reaction can proceed mildly in a cooled system because cooled hexane is charged into the system from near the catalyst feed port and the bottom of a reactor at the same time with the catalyst.

The powder thus obtained by polymerization is preferably dried over 3 hours or longer and 4 hours or shorter while nitrogen of 80° C. or lower is blown thereto. The amount of a low-molecular-weight component can be increased by suppressing rapid reaction and rapid polymerization and drying the resulting powder under mild conditions. In addition, the entanglement of a molecular chain can be reduced by controlling the degree of crystallinity of the polymer to be not too high. In this way, the powder of the present embodiment is obtained.

Examples of the polymerization method for the polyethylene in the method for producing the ultra-high molecular weight polyethylene powder of the present embodiment include methods for (co)polymerizing ethylene or monomers including ethylene by a suspension polymerization or vapor-phase polymerization method. Among them, the suspension polymerization method is preferred because this method can efficiently remove polymerization heat. In the suspension polymerization method, an inert hydrocarbon vehicle can be used as a vehicle. The olefin itself can also be used as a solvent.

Specific examples of such an inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the method for producing the ultra-high molecular weight polyethylene powder, the polymerization temperature is usually 30° C. or higher and 100° C. or lower. The polymerization temperature is preferably 40° C. or higher, more preferably 50° C. or higher and preferably 95° C. or lower, more preferably 90° C. or lower. The polymerization temperature equal to or higher than 30° C. tends to realize efficient industrial production. On the other hand, the polymerization temperature equal to or lower than 100° C. tends to realize continuous stable operation.

In the method for producing the ultra-high molecular weight polyethylene powder, the polymerization pressure is usually atmospheric pressure or higher and 2 MPa or lower. The polymerization pressure is preferably 0.1 MPa or higher, more preferably 0.12 MPa or higher and preferably 1.5 MPa or lower, more preferably 1.0 MPa or lower. The polymerization pressure equal to or higher than atmospheric pressure tends to realize efficient industrial production. The polymerization pressure equal to or lower than 2 MPa tends to be able to suppress partial heat generation ascribable to rapid polymerization reaction during the introduction of a catalyst, and realize stable production of the ultra-high molecular weight polyethylene powder.

The polymerization reaction can be carried out by any of batch, semicontinuous, and continuous methods. Continuous polymerization is preferred. A partial high-temperature state ascribable to rapid ethylene reaction can be suppressed by continuously supplying ethylene gas, a solvent, a catalyst, etc., into the polymerization system while continuously discharging them together with produced ultra-high molecular weight polyethylene powders. Thus, the polymerization system is further stabilized. Ethylene reaction in a homogeneous state in the system prevents the formation of branches and/or double bonds or the like in polymer chains and is less likely to cause reduction in molecular weight and/or cross-linking of the ultra-high molecular weight polyethylene powder. The resulting ultra-high molecular weight polyethylene powder decreases unmelted matter remaining when melted or dissolved, is prevented from being colored, and is less likely to present problems such as reduced mechanical properties. Accordingly, the continuous method, which achieves a more homogeneous polymerization system, is preferred.

Alternatively, the polymerization may be carried out at two or more stages differing in reaction conditions. The intrinsic viscosity of the resulting ultra-high molecular weight polyethylene powder can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in production of the ultra-high molecular weight polyethylene powder can be included.

For the polymerization for the ultra-high molecular weight polyethylene powder, an antistatic agent such as Stadis 450 manufactured by The Associated Octel Company Ltd. (agent: Maruwa Bussan K.K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, with respect to the amount of the ultra-high molecular weight polyethylene powder produced per unit time.

[Additive]

The ultra-high molecular weight polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. The content of the slip agent or the neutralizer is not particularly limited and is 5000 ppm or lower, preferably 4000 ppm or lower, more preferably 3000 ppm or lower.

The antioxidant is not particularly limited and is preferably, for example, a phenol compound or a phenol-phosphorus compound, specifically include: phenol antioxidants such as 2,6-di-t-butyl-4-methylphenol(dibutylhydroxytoluene), n-octadecyl-3-(4-hydroxy-3,5-di-t-butylphenyl)propionate, and tetrakis(methylene (3,5-di-t-butyl-4-hydroxyhydrocinnamate))methane; phenol-phosphorus antioxidants such as 6-[3-(3-t-butyl-4-hydroxy-5-methylphenyl)propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis(2,4-t-butylphenyl phosphite).

The amount of the antioxidant in the ultra-high molecular weight polyethylene powder of the present embodiment is usually 100 ppm or higher and 5000 ppm or lower, preferably 100 ppm or higher and 4000 ppm or lower, more preferably 100 ppm or higher and 3000 ppm or lower.

The ultra-high molecular weight polyethylene powder containing 100 ppm or higher of the antioxidant is less susceptible to embrittlement and/or discoloration, reduction in mechanical properties, etc., because of the suppressed degradation thereof, resulting in better long-term stability. The antioxidant contained in an amount of 5000 ppm or lower can suppress coloration ascribable to the antioxidant itself or a modified form of the antioxidant or coloration caused by the reaction of the antioxidant with the metal components.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light stabilizer is not particularly limited and is usually 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

The content of an organic additive contained in the fiber made of the ultra-high molecular weight polyethylene powder can be determined by subjecting the fiber to extraction for 6 hours by Soxhlet extraction using tetrahydrofuran (THF), and separating the extract by liquid chromatography, followed by quantification. Also, the content of an inorganic additive can be quantified from an ash weight obtained by the combustion of the fiber made of the ultra-high molecular weight polyethylene powder in an electric furnace.

[Molded Article]

The ultra-high molecular weight polyethylene powder fiber of the present embodiment can be processed by various methods. A molded article obtained using the ultra-high molecular weight polyethylene powder can be employed in various uses. The molded article is not limited and is suitable for, for example, a microporous membrane for secondary battery separators, particularly, a microporous membrane for lithium ion secondary battery separators, a sintered body, a fiber, or gel spinning. Examples of the method for producing the microporous membrane include a processing method based on a wet process using a solvent, which involves extrusion in an extruder equipped with a T die, drawing, extraction, and drying.

The molded article can also be used as a molded article obtained by sintering the ethylene polymer, a filter, and a dust collector, etc. by exploiting excellent features such as abrasion resistance, high slidability, high strength, and high impact resistance, which are the properties of the high-molecular-weight ethylene polymer.

The ultra-high molecular weight polyethylene powder of the present embodiment can be spun to obtain an ultra-high molecular weight polyethylene fiber. Examples of the method for producing the ultra-high molecular weight polyethylene fiber include a method which involves kneading and spinning liquid paraffin and the ultra-high molecular weight polyethylene powder, followed by heating and drawing.

EXAMPLES

Hereinafter, the present invention will be described more specifically with reference to Examples and Comparative Examples. However, the present invention is not intended to be limited by Examples below by any means.

[Methods and Conditions for Measuring]

The physical properties of ultra-high molecular weight polyethylene powders of Examples and Comparative Examples were measured by the following methods.

(1) Viscosity-Average Molecular Weight (Mv)
1) 10 mg of each ultra-high molecular weight polyethylene powder was weighed and charged into a test tube.
2) 20 mL of decalin (decahydronaphthalene) was charged into the test tube.
3) The ultra-high molecular weight polyethylene powder was dissolved by stirring at 150° C. for 2 hours.
4) The falling time (ts) between gauges of the solution was measured in a thermostat bath of 135° C. using an Ubbelohde-type viscometer.
5) The falling time (ts) between gauges of 5 mg of the ultra-high molecular weight polyethylene powder was measured in the same way as above.
6) The falling time (tb) of decalin alone was measured as a blank without the addition of the ultra-high molecular weight polyethylene powder.
7) The reduced viscosity ($\eta sp/C$) of each ultra-high molecular weight polyethylene powder determined according to the expression given below was plotted to obtain a linear equation of the concentration (C) and the reduced viscosity ($\eta sp/C$) of the ultra-high molecular weight polyethylene powder. The intrinsic viscosity ($\eta$) extrapolated to the concentration 0 of the ultra-high molecular weight polyethylene powder was determined.

$$\eta sp/C=(ts/tb-1)/0.1$$

8) The viscosity-average molecular weight (Mv) was determined from this intrinsic viscosity (i) according to the following expression.

$$Mv=(5.34\times10^4)\times[\eta]^{1.49}$$

(2) Average Particle Size

The average particle size of each ultra-high molecular weight polyethylene powder was defined as a particle size that reached 50% by mass in an integral curve in which the masses of particles remaining on respective sieves in the classification of 100 g of particles using 10 types of sieves (aperture size: 710 μm, 500 μm, 425 μm, 355 μm, 300 μm, 212 μm, 150 μm, 106 μm, 75 μm, and 53 μm) stipulated by JIS Z 8801 were integrated from the larger aperture size.

(3) Content of Particle Having Particle Size of 53 μM or Smaller

The content of a particle having a particle size of 53 μm or smaller was determined as the mass (g) of particles passing through a sieve having an aperture size of 53 μm with respect to the total mass of particles (ultra-high molecular weight polyethylene powder) in the measurement of (2) Average particle size described above.

The content (%) of the particle having a particle size of 53 μm or smaller was calculated according to the following expression from the thus-determined mass of particles passing through a sieve having an aperture size of 53 μm.

content (%) of the particle having a particle size of 53 μm or smaller=[Mass (g) of particles passing through a sieve having an aperture size of 53 μm]/[Total mass 100 (g) of particles (ultra-high molecular weight polyethylene powder)]×100

(4) Measurement of Quantity of Heat of Melting (ΔH1) and Melting Point (Tm1)

The heat of melting of each ultra-high molecular weight polyethylene powder was measured using a differential scanning calorimeter Pyris 1 (trade name) manufactured by PerkinElmer, Inc. The quantity of heat of melting (ΔH1) of the ultra-high molecular weight polyethylene powder was determined by keeping 8.4 mg of a sample at 50° C. for 1 minute, then heating the sample to 180° C. at a rate of 10° C./min, and dividing the total quantity of heat calculated from the whole crystal peak area in the melting curve thus obtained by the mass of the sample.

The melting point (Tm1) of the ultra-high molecular weight polyethylene powder is a value measured using a differential scanning calorimeter Pyris 1 (trade name) manufactured by PerkinElmer, Inc. The melting point was determined by keeping 8.4 mg of a sample at 50° C. for 1 minute, and then heating the sample to 180° C. at a rate of 10° C./min.

(5) Measurement of Kneading Torque

Kneading torque measurement in Examples and Comparative Examples was performed by the following method.

Liquid paraffin and each ultra-high molecular weight polyethylene powder were kneaded at composition of 95% by mass and 5% by mass, respectively, with respect to the total mass of the liquid paraffin and the ultra-high molecular weight polyethylene powder. Specifically, 2.0 g of the ultra-high molecular weight polyethylene powder, 38.0 g of liquid paraffin (product name: Smoil P-350P) manufactured by MORESCO Corp., and 0.4 g of tetrakis[methylene(3,5-di-t-butyl-4-hydroxy-hydrocinnamate)]methane (product name: ANOX20) manufactured by Great Lakes Chemical Japan were added to a 200 ml poly-cup and well mixed. Then, Labo Plastomill Mixer (unit model: 30C150, mixer model: R-60) manufactured by Toyo Seiki Seisaku-sho, Ltd. was charged therewith, and the mixture was kneaded at 130° C. for 30 minutes, subsequently kneaded under heating to 240° C. at a rate of 22° C./min, and further kneaded at 240° C. for 15 minutes. The number of rotations was 50 rpm for all the procedures. The maximum torque value and a resin temperature that exhibited the maximum torque value were read from change in average torque calculated using Labo Plastomill Mixer Test Program Ver. 4.52 (copyright(C), Toyo Seiki Seisaku-sho, Ltd.) to confirm whether or not the difference between a temperature at which a torque value reached 80% of the maximum torque value and a temperature at which the torque value reached 20% of the maximum torque value would fall within the temperature range of 0.1° C. or more and 50° C. or less.

(6) Method for Calculating Ratio ($BD_{53}/BD_{300}$) of Ultra-High Molecular Weight Polyethylene Powder 1) Each ultra-high molecular weight polyethylene powder was classified through screen meshes having an aperture size of 300 μm, 250 μm, 180 μm, 150 μm, 106 μm, 75 μm, or 53 μm conforming to the specification of JIS Z 8801.

2) An on-powder of the 300 μm screen mesh and a pass-through powder of the 53 μm screen mesh were separated from these fractions of the classified ultra-high molecular weight polyethylene powder.

3) If necessary, each powder was sifted through a 1.0 mm sieve.

4) Each powder was travelled down to a 100 cc cylindrical container until overflowing via a calibrated orifice of a funnel having a standard dimension according to JIS K 6891.

5) In order to prevent consolidation and/or the overflow of the powder from the cup, the blade of a spatula or the like was smoothly moved in a vertical fashion in contact with the upper face of the container to carefully scrape off an excess of powder from the upper face of the container.

6) The sample was wholly removed also from the side of the container, and the mass of the powder together with the container was measured. The mass of the vacant container for measurement measured in advance was subtracted therefrom to calculate the mass (m) of the powder up to 0.1 g.

7) The bulk density (g/cc) was calculated according to the following expression.

Bulk density (g/cc)=Mass (m) of the powder/Volume (cc) of the cylindrical container 8) The measurement described above was performed three times, and the average value thereof was recorded.

9) $BD_{53}/BD_{300}$ was calculated from the bulk density ($BD_{300}$) of the on-powder of 300 μm screen mesh and the bulk density ($BD_{53}$) of the pass-through powder of the 53 μm screen mesh.

(7) Tap density of on-powder in classification through screen mesh having aperture size of 212 μm The tap density of each ultra-high molecular weight polyethylene powder was measured by the method described in JIS K-7370: 2000.

(8) Molecular Weight Distribution (Mw/Mn)

To 1 mg of each ultra-high molecular weight polyethylene powder, 10 mL of trichlorobenzene (TCB) was added, and the mixture was stirred at 150° C. for 4 hours to prepare a sample solution, which was then measured by gel permeation chromatography (GPC) under conditions described below. From the measurement results, the number-average molecular weight (Mn), the weight-average molecular weight (Mw), and the molecular weight distribution (Mw/Mn) were determined on the basis of a calibration curve prepared using commercially available monodisperse polystyrene.

Apparatus: TSKgel (manufactured by Tosoh Corp.)
Detector: RI detector
Mobile phase: trichlorobenzene (TCB)
Flow rate: 1.00 mL/min
Column: two connected columns of TSK-gel GMHHR-H (20) HR (manufactured by Tosoh Corp.)
Column temperature: 150° C.

[Evaluation Method]

Melt strength (MT) was measured when a kneaded gel obtained by kneading using Labo Plastomill Mixer (unit model: 30C150, mixer model: R-60) manufactured by Toyo Seiki Seisaku-sho, Ltd. was spun using Capilograph (unit model: Capilograph 1D) manufactured by Toyo Seiki Seisaku-sho, Ltd.

From a low value of melt strength, it can be predicted that a molecular chain is disentangled, and the resulting gel tends to be highly drawable. From a smaller hunting width of the value of melt strength, it can be predicted that a homogeneous kneaded product can be obtained, and a thread having a uniform thread diameter tends to be able to be obtained.

The spinning was carried out under conditions involving a constant temperature of 190° C., an extrusion rate of 10 mm/min, and a take-over speed of 3 m/min, and a thread was collected for 3 minutes. The operation of extracting liquid paraffin with hexane from the undrawn thread thus obtained was performed. The extraction was carried out for a time of 1 hour×2 sets. Then, the thread was dried for 1 day, and the thread diameter was then measured at randomly selected 20 sites using an optical system microscope (unit model: BX51TRF-6(D)) manufactured by Olympus Corp. to calculate an average thread diameter.

The undrawn thread dried for 1 day was also used to carry out primary drawing and secondary drawing using a tensile tester equipped with a thermostat bath. The thermostat bath used was a thermostat bath (unit model: TLF-R3T-C-W) manufactured by A&D Co., Ltd., and the tensile tester used was TENSILON (unit model: RTC-1310A) manufactured by A&D Co., Ltd. For the primary drawing, the undrawn thread was inserted between chucks and drawn under conditions involving 120° C. and a tension rate of 20 mm/min. The ratio (A) of the primary drawing was calculated on the basis of the degree of this drawing. For the secondary drawing, the primarily drawn thread was inserted between chucks and drawn under conditions involving 140° C. and a tension rate of 10 mm/min. The ratio (B) of the secondary drawing was calculated on the basis of the degree of this drawing. In light of these results, the ratio (A) of the primary drawing was multiplied by the ratio (B) of the secondary drawing to calculate a final draw ratio. The primary draw ratio is the same ratio between Examples and Comparative Examples, and the secondary draw ratio differs among Examples and Comparative Examples. The secondary draw ratio was defined as a value obtained when the thread was drawn until break, and was calculated from an average value of 10 measurements.

The spinning test was conducted at a constant temperature of 190° C., an extrusion rate of 10 mm/min, and a take-over speed of 3 m/min. The time for which the thread was continuously spinnable without end breakage was separately measured.

(Evaluation Criteria: Value of Melt Strength)
- ⊚ means that the melt strength was 0.1 mN or more and less than 10 mN.
- ◯ means that the melt strength was 10 mN or more and less than 20 mN.
- x means that the melt strength was 20 mN or more.

(Evaluation Criteria: Hunting Width of Value of Melt Strength)
- ⊚ means that the hunting width of melt strength was average value±1 mN or more and less than 3 mN.
- ◯ means that the hunting width of melt strength was average value±3 mN or more and less than 5 mN.
- x means that the hunting width of melt strength was average value±5 mN or more.

(Evaluation Criteria: Uniformity of Thread Diameter)
- ⊚ means that the average thread diameter was ±5 μm or more and less than 10 μm.
- ◯ means that the average thread diameter was ±10 μm or more and less than 20 μm.
- x means that the average thread diameter was ±20 μm or more.

(Evaluation Criteria: Final Draw Ratio)
- ⊚ means that the final draw ratio was ×60 or more.
- ◯ means that the final draw ratio was ×30 or more and less than ×60.
- x means that the final draw ratio was less than ×30.

(Evaluation Criteria: Continuous Spinning)
- ⊚ represents being continuously spinnable for 30 minutes or longer.
- ◯ represents being continuously spinnable for 10 minutes or longer and shorter than 30 minutes.
- x represents being continuously spinnable for only shorter than 10 minutes.

[Method for Synthesizing Catalyst]

Reference Example 1

Catalyst Synthesis Example 1

Preparation of Solid Catalytic Component [A]

To an 8 L stainless autoclave purged with nitrogen, 1,600 mL of hexane was added. To this autoclave, 800 mL of a hexane solution containing 1.5 mol/L titanium tetrachloride and 800 mL of a hexane solution containing 0.8 mol/L organic magnesium compound represented by the compositional formula $AlMg_5(C_4H_9)_{11}(OSiH)_2$ were added at the same time over 4 hours with stirring at 10° C. After the addition, the mixture was gradually heated, and the reaction was continued at 10° C. for 1.5 hour. After the completion of the reaction, 1,600 mL of the supernatant was removed, and the resulting solid was washed with 1,600 mL of hexane ten times to prepare solid catalytic component [A]. The amount of titanium contained per g of this solid catalytic component was 3.20 mmol.

Reference Example 2

Catalyst Synthesis Example 2

Preparation of Supported Metallocene Catalytic Component

Spherical silica having an average particle size of 20 μm, a surface area of 600 m$^2$/g, and an intra-particle pore volume of 1.5 mL/g was fired at 500° C. for 5 hours under the nitrogen atmosphere for dehydration to obtain dehydrated silica. The amount of surface hydroxy groups on the dehydrated silica was 1.80 mmol per g of $SiO_2$. In a 1.8 L autoclave, 40 g of the dehydrated silica was dispersed in 800 mL of hexane under the nitrogen atmosphere to obtain slurry. While the temperature of the obtained slurry was kept at 50° C. with stirring, 80 mL of a hexane solution of triethyl aluminum (concentration: 1 mol/L) was added thereto. Then, the mixture was stirred for 3 hours such that the triethyl aluminum was reacted with the surface hydroxy groups of the silica to obtain component [a] containing triethyl aluminum-treated silica (in which the surface hydroxy groups of the triethyl aluminum-treated silica were capped by the triethyl aluminum) and a supernatant. Then, the supernatant in the obtained reaction mixture was removed by decantation to remove unreacted triethyl aluminum in the supernatant. Then, an appropriate amount of hexane was added to the resulting silica to obtain 850 mL of hexane slurry of triethyl aluminum-treated silica.

Meanwhile, [(N-t-butylamido) (tetramethyl-η$^5$-cyclopentadienyl)dimethylsilane]titanium-1,3-pentadiene (hereinafter, referred to as a "titanium complex") was dissolved at 200 mmol in 1000 mL of Isopar E (trade name of hydrocarbon mixture manufactured by Exxon Chemical Co., Inc. (US)). To this solution, 20 mL of a hexane solution containing 1 mol/L compound of the formula $AlMg_6(C_2H_5)_3(n-C_4H_9)_{12}$ synthesized in advance from triethyl aluminum and dibutyl magnesium was added. The titanium complex concentration was adjusted to 0.1 mol/L by the addition of hexane to obtain component [b].

Bis(hydrogenated tallow alkyl)methylammonium-tris (pentafluorophenyl) (4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 2 hours to obtain a reaction mixture containing the borate.

To 800 mL of the slurry of the component [a] obtained above, 46 mL of the reaction mixture containing the above borate was added with stirring at 15 or higher and 20° C. or lower to allow the borate to be supported by the silica. In this way, slurry of the borate-supported silica was obtained. To this slurry, 32 mL of the component [b] obtained above was further added, and the mixture was stirred for 4 hours such that the titanium complex was reacted with the borate. In this way, supported metallocene catalyst [B] containing silica with a catalytic active species formed thereon, and a supernatant was obtained.

Then, the supernatant in the obtained reaction mixture was removed by decantation to remove unreacted triethyl aluminum in the supernatant.

Ethylene and hexane used in polymerization for the ultra-high molecular weight polyethylene powders of Examples and Comparative Examples were dehydrated using MS-3A (manufactured by UNION SHOWA K.K.). The hexane was used after being further deoxidated by deaeration under reduced pressure using a vacuum pump.

Example 1

Hexane, ethylene, hydrogen, and the solid catalytic component [A] were continuously supplied to a vessel-type polymerization reactor equipped with a stirring apparatus. An ultra-high molecular weight polyethylene powder (ethylene homopolymer) was produced at a rate of 10 kg/hr. The hydrogen was used at 99.99% by mol or more after being purified by the contact with a molecular sieve. The solid catalytic component [A] was supplied, together with 10 NL/hr of the hydrogen (NL represents normal liter (volume in terms of a normal state)) and at the same time with the hexane, from the bottom of the polymerization reactor at a rate of 0.15 mmol/L using the hexane as a transporting solution such that the production rate was 10 kg/hr. The solid catalytic component [A] was adjusted to 10° C. and added at a rate of 0.2 g/hr, while triisobutyl aluminum was adjusted to 22° C. and added at a rate of 5 mmol/hr. The catalytic activity was 11,000 g-PE/g-solid catalytic component [A]. The internal humidity of the polymerization reactor was kept at 0 ppm. The solvent hexane was adjusted to 5° C. and supplied to the polymerization reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultra-high molecular weight polyethylene powder was 10% by mass with respect to the mass of the ultra-high molecular weight polyethylene powder. The separated ultra-high molecular weight polyethylene powder was dried slowly over time (4 hours or longer and 5 hours or shorter) while nitrogen was blown thereto at a low temperature of 80° C. or lower. In this drying step, steam was sprayed onto the powder after the polymerization to deactivate the catalyst and the promoter. The obtained ultra-high molecular weight polyethylene powder was passed through a sieve having an aperture size of 425 µm such that particles that failed to pass through the sieve were removed to obtain an ultra-high molecular weight polyethylene powder of Example 1. The physical properties of the obtained ultra-high molecular weight polyethylene powder are shown in Table 1.

Example 2

An ultra-high molecular weight polyethylene powder of Example 2 was obtained in the same way as in Example 1 except that 1-butene was introduced at 6.3 mol % with respect to ethylene from a gas phase. The physical properties of the obtained ultra-high molecular weight polyethylene powder are shown in Table 1.

Example 3

An ultra-high molecular weight polyethylene powder of Example 3 was obtained in the same way as in Example 1 except that the polymerization temperature was kept at 48° C. The physical properties of the obtained ultra-high molecular weight polyethylene powder are shown in Table 1.

Example 4

An ultra-high molecular weight polyethylene powder of Example 4 was obtained in the same way as in Example 3 except that 1-butene was introduced at 6.3 mol % with respect to ethylene from a gas phase. The physical properties of the obtained ultra-high molecular weight polyethylene powder are shown in Table 1.

Example 5

An ultra-high molecular weight polyethylene powder of Example 5 was obtained in the same way as in Example 1 except that the temperature of the solvent hexane was adjusted to 15° C. The physical properties of the obtained ultra-high molecular weight polyethylene powder are shown in Table 1.

Example 6

An ultra-high molecular weight polyethylene powder of Example 6 was obtained in the same way as in Example 1 except that the drying was carried out slowly over time (3 hours or longer and 4 hours or shorter) while nitrogen was blown at 85° C. The physical properties of the obtained ultra-high molecular weight polyethylene powder are shown in Table 1.

Comparative Example 1

Hexane, ethylene, hydrogen, and the solid catalytic component [A] were continuously supplied to a vessel-type polymerization reactor equipped with a stirring apparatus. An ultra-high molecular weight polyethylene powder (ethylene homopolymer) was produced at a rate of 10 kg/hr. The hydrogen was used at 99.99% by mol or more after being purified by the contact with a molecular sieve. The solid catalytic component [A] was added, together with 10 NL/hr of the hydrogen (NL represents normal liter (volume in terms of a normal state)), from the intermediate point between the surface of the solution in the polymerization reactor and the bottom of the reactor at a rate of 0.15 mmol/L using the hexane as a transporting solution such that the production rate was 10 kg/hr. The solid catalytic component [A] was also adjusted to 10° C. and added from the intermediate portion between the surface of the solution in the polymerization reactor and the bottom of the reactor at a rate of 0.2 g/hr, while triisobutyl aluminum was adjusted to 22° C. and added from the intermediate portion between the surface of the solution in the polymerization reactor and the bottom of the reactor at a rate of 5 mmol/hr. The catalytic activity was 11,000 g-PE/g-solid catalytic component [A]. The internal humidity of the polymerization reactor was kept at 0 ppm. The solvent hexane was adjusted to 20° C. and supplied from the intermediate portion between the surface of the solution in the polymerization reactor and the bottom of the reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultra-high molecular weight polyethylene powder was 10% by mass with respect to the mass of the ultra-high molecular weight polyethylene powder. The separated ultra-high molecular weight polyethylene powder was dried for 1 to 2 hours while nitrogen was blown thereto at a temperature of 100° C. In this drying step, steam was sprayed onto the powder after the polymerization to deactivate the catalyst and the promoter. The obtained ultra-high molecular weight polyethylene powder was passed through a sieve having an aperture size of 425 μm such that particles that failed to pass through the sieve were removed to obtain an ultra-high molecular weight polyethylene powder of Comparative Example 1. The physical properties of the obtained ultra-high molecular weight polyethylene powder are shown in Table 1.

Comparative Example 2

An ultra-high molecular weight polyethylene powder of Comparative Example 2 was obtained in the same way as in Comparative Example 1 except that 1-butene was introduced at 6.3 mol % with respect to ethylene from a gas phase. The physical properties of the obtained ultra-high molecular weight polyethylene powder are shown in Table 1.

Comparative Example 3

Hexane, ethylene, hydrogen, and the supported metallocene catalytic component [B] were continuously supplied to a vessel-type polymerization reactor equipped with a stirring apparatus. An ultra-high molecular weight polyethylene powder (ethylene homopolymer) was produced at a rate of 10 kg/hr. The hydrogen was used at 99.99% by mol or more after being purified by the contact with a molecular sieve. The supported metallocene catalytic component [B] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the solvent hexane as a transporting solution such that the production rate was 10 kg/hr. The supported metallocene catalytic component [B] was also adjusted to 12° C. and added from the intermediate portion between the surface of the solution in the polymerization reactor and the bottom of the reactor at a rate of 0.2 g/hr, while triisobutyl aluminum was adjusted to 22° C. and added from the intermediate portion between the surface of the solution in the polymerization reactor and the bottom of the reactor at a rate of 5 mmol/hr. The catalytic activity was 11,000 g-PE/g-supported metallocene catalytic component [B]. The polymerization temperature was kept at 70° C. The internal humidity of the polymerization reactor was kept at 0 ppm. The solvent hexane was adjusted to 20° C. and supplied from the intermediate portion between the surface of the solution in the polymerization reactor and the bottom of the reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the ultra-high molecular weight polyethylene powder was 10% by mass with respect to the mass of the ultra-high molecular weight polyethylene powder. The separated ultra-high molecular weight polyethylene powder was dried for 1 to 2 hours while nitrogen was blown thereto at 100° C. In this drying step, steam was sprayed onto the powder after the polymerization to deactivate the catalyst and the promoter. The obtained ultra-high molecular weight polyethylene powder was passed through a sieve having an aperture size of 425 μm such that particles that failed to pass through the sieve were removed to obtain an ultra-high molecular weight polyethylene powder of Comparative Example 3. The physical properties of the obtained ultra-high molecular weight polyethylene powder are shown in Table 1.

Comparative Example 4

An ultra-high molecular weight polyethylene powder of Comparative Example 4 was obtained in the same way as in Comparative Example 3 except that the polymerization temperature was kept at 55° C. The physical properties of the obtained ultra-high molecular weight polyethylene powder are shown in Table 1.

Comparative Example 5

An ultra-high molecular weight polyethylene powder of Comparative Example 5 was obtained in the same way as in Comparative Example 3 except that propylene was introduced at 0.38 mol % with respect to ethylene from a gas phase. The physical properties of the obtained ultra-high molecular weight polyethylene powder are shown in Table 1.

TABLE 1

| | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Polyethylene | Homo | Copoly | Homo | Copoly | Homo | Homo | Homo | Copoly | Homo | Homo | Copoly |
| Viscosity-average molecular weight ($\times 10^4$) | 350 | 370 | 680 | 670 | 350 | 350 | 350 | 370 | 360 | 670 | 370 |
| Difference in temperature between 80% and 20% of maximum torque value (° C.) | 5 | 4 | 2 | 5 | 5 | 5 | 54 | 56 | 52 | 51 | 51 |
| Mw/Mn | 8.6 | 8.7 | 8.6 | 8.7 | 8.6 | 8.6 | 8.8 | 8.6 | 5.4 | 5.2 | 5.2 |
| Content of particle having particle size of 53 μm or smaller (%) | 3 | 4 | 3 | 6 | 11 | 4 | 12 | 13 | 15 | 13 | 14 |
| Tap density of 212 μm on-powder (g/cm$^3$) | 0.56 | 0.57 | 0.55 | 0.56 | 0.58 | 0.57 | 0.62 | 0.63 | 0.37 | 0.35 | 0.36 |
| $BD_{53}/BD_{300}$ | 1.2 | 1.1 | 1.3 | 1.2 | 1.5 | 1.3 | 1.6 | 1.8 | 1.6 | 1.6 | 1.7 |
| Tm1 (° C.) | 142 | 137 | 143 | 138 | 143 | 144 | 146 | 136 | 146 | 146 | 137 |
| ΔH1 (J/g) | 220 | 198 | 225 | 199 | 215 | 232 | 210 | 201 | 182 | 188 | 165 |
| Si content in ultra-high molecular weight polyethylene powder (ppm) | 0 | 0 | 0 | 0 | 0 | 0 | 0 | 0 | 47 | 53 | 56 |
| Melt strength | ◎ | ◎ | ◎ | ◎ | ○ | ○ | X | X | X | X | X |
| Hunting width of melt strength | ◎ | ◎ | ◎ | ◎ | ○ | ○ | X | X | X | X | X |
| Uniformity of thread diameter | ◎ | ◎ | ◎ | ◎ | ○ | ○ | X | X | X | X | X |
| Final draw ratio | ◎ | ○ | ◎ | ○ | ○ | ○ | X | X | X | X | X |
| Continuous spinning | ◎ | ◎ | ◎ | ◎ | ○ | ○ | X | X | X | X | X |

The present application is based on Japanese Patent Application No. 2017-235199 filed on Dec. 7, 2017 and Japanese Patent Application No. 2018-223735 filed on Nov. 29, 2018, the contents of which are incorporated herein by reference.

INDUSTRIAL APPLICABILITY

The ultra-high molecular weight polyethylene powder of the present invention can produce an ultra-high molecular weight polyethylene fiber having a uniform thread diameter and is highly drawable and continuously spinnable. Specifically, the ultra-high molecular weight polyethylene powder of the present invention has industrial applicability to uses including: high-performance textiles such as various types of sports clothing and various safety products (e.g., bullet-proof clothing, protective clothing and protective gloves); various rope products such as tag ropes, mooring ropes, sailboat ropes, and construction ropes; various braid products such as fishing lines and blind cables; net products such as fishing nets and safety nets; reinforcement materials or various unwoven fabrics such as chemical filters and battery separators; screen materials such as tents; prepregs for sports (e.g., helmets and ski plates) or for speaker cones; and reinforcing fibers for composites for the reinforcement of concrete.

The invention claimed is:

1. An ultra-high molecular weight polyethylene powder having a viscosity-average molecular weight of $10\times10^4$ or higher and $1000\times10^4$ or lower, wherein
a difference between a temperature at which a torque value reaches 80% of the maximum torque value and a temperature at which the torque value reaches 20% of the maximum torque value is 0.1° C. or more and 50° C. or less in torque value measurement under the following <kneading condition>:
<kneading condition>
raw material:
a mixture containing 5 parts by mass of the ultra-high molecular weight polyethylene powder and 95 parts by mass of liquid paraffin based on 100 parts by mass in total of the ultra-high molecular weight polyethylene powder and the liquid paraffin, torque value measurement condition:
the raw material is kneaded at 130° C. for 30 minutes and then further kneaded at 240° C. for 15 minutes;
a heating rate from 130° C. to 240° C. is set to 22° C./min;
a rotation number of a screw is set to 50 rpm; and
the measurement is performed under a nitrogen atmosphere.

2. The ultra-high molecular weight polyethylene powder according to claim 1, wherein the ultra-high molecular weight polyethylene powder has Mw/Mn of 6 or more and 14 or less.

3. The ultra-high molecular weight polyethylene powder according to claim 1, wherein a content of an ultra-high molecular weight polyethylene powder particle of 53 μm or smaller is less than 10% by mass.

4. The ultra-high molecular weight polyethylene powder according to claim 1, wherein a tap density of an on-powder in classification of the ultra-high molecular weight polyethylene powder through a screen mesh having an aperture size of 212 μm is 0.50 g/cm$^3$ or larger and 0.60 g/cm$^3$ or smaller.

5. The ultra-high molecular weight polyethylene powder according to claim 1, wherein a ratio ($BD_{53}/BD_{300}$) of a bulk density ($BD_{53}$) of a pass-through powder in classification of the ultra-high molecular weight polyethylene powder through a screen mesh having an aperture size of 53 μm with respect to a bulk density ($BD_{300}$) of an on-powder in classification of the ultra-high molecular weight polyethylene powder through a screen mesh having an aperture size of 300 μm is 0.7 or more and 1.4 or less.

6. The ultra-high molecular weight polyethylene powder according to claim 1, wherein the ultra-high molecular weight polyethylene powder has a melting point (Tm1) of 135° C. or higher and 145° C. or lower in DSC measurement.

7. The ultra-high molecular weight polyethylene powder according to claim 1, wherein the ultra-high molecular weight polyethylene powder has a quantity of heat of melting (ΔH1) of 190 J/g or more and 230 J/g or less in DSC measurement.

8. The ultra-high molecular weight polyethylene powder according to claim 1, wherein the amount of Si remaining in the ultra-high molecular weight polyethylene powder is less than 1 ppm.

9. An ultra-high molecular weight polyethylene fiber prepared by spinning an ultra-high molecular weight polyethylene powder according to claim 1.

* * * * *